(12) United States Patent
Cheng

(10) Patent No.: US 6,593,700 B1
(45) Date of Patent: Jul. 15, 2003

(54) ORNAMENTAL DISPLAY LAMP ASSEMBLY

(76) Inventor: Shao-Szu Cheng, P.O. Box 82-144, Taipei (TW)

( * ) Notice: Subject to any disclaimer, the term of this patent is extended or adjusted under 35 U.S.C. 154(b) by 0 days.

(21) Appl. No.: 10/133,490

(22) Filed: Apr. 29, 2002

(51) Int. Cl.[7] .............................................. H05B 37/00
(52) U.S. Cl. ........................ 315/149; 362/806; 315/150
(58) Field of Search ................................. 315/149, 158, 315/159, 150; 362/800, 806

(56) References Cited

U.S. PATENT DOCUMENTS 4,866,580 A * 9/1989 Blackerby .................. 362/205

* cited by examiner

Primary Examiner—David Vu
(74) Attorney, Agent, or Firm—Leong C. Lei

(57) ABSTRACT

An ornamental display lamp assembly is constructed to include a base holding a light source, an artificial plant fixedly mounted on the base, a plurality of first fiber optics embedded in the artificial plant and adapted to receive light from the light source, a plurality of second fiber optics, a plurality of first fiber optic connectors mounted in the artificial plant and connected one-to-one between the first fiber optics and the second fiber optics, a plurality of third fiber optics adapted for guiding out light from the second fiber optics, and a plurality of second fiber optic connectors respectively connected between the second fiber optics and the third fiber optics, each second fiber optic connecting one second fiber optic to a number of the third fiber optics.

4 Claims, 3 Drawing Sheets

ORNAMENTAL DISPLAY LAMP ASSEMBLY

BACKGROUND OF THE INVENTION

1. Field of the Invention

The present invention relates to an ornamental display lamp assembly and, more particularly, to such an ornamental display lamp assembly, which uses fiber optics and fiber optic connectors to transmit light from a light source at the root of an artificial plant to multiple end points of the artificial plant to produce a lighting effect.

2. Description of the Related Art

Conventional ornamental display lamp assemblies are commonly comprised of a shaped support, for example, an artificial plant, and light sets hung on the support. Because light sets are comprised of a big amount of bulbs disposed on the outside of the support, an electric leakage or short circuit tends to occur. Further, if the user adds too many light sets to the power cord, an overload accident may occur.

In 1930, people started to research fiber optics. However, the fiber optic semiconductor technology was not matured at that time, fiber optic transmission loss was severe. The transmission loss was as high as 1000 decibels per kilometer. Due to severe attenuation in transmission of light, fiber optics at that time were not suitable for distance transmission of light. After 1982, laser semiconductor and fiber optic transmission technology has been well developed. Nowadays, fiber optics are intensively used for communication for the advantages of low color dispersion, low transmission loss, high bandwidth, being free from electromagnetic interference, high security, light in weight, high temperature and acid resisting properties, etc.

SUMMARY OF THE INVENTION

The present invention has been accomplished under the circumstances in view. It is one object of the present invention to provide an ornamental display lamp assembly, which uses an artificial plant as support means, and fiber optics as transmission medium to transmit light from the root of the artificial plant to multiple end points of the artificial plant to produce a lighting effect. It is another object of the present invention to provide an ornamental display lamp assembly, which is suitable for use indoors as well as outdoors without causing an electric leakage. To achieve these and other objects of the present invention, the ornamental display lamp assembly comprises a base; a light source mounted inside the base; a power cord extended from the light source to the outside of the base for connection to power source; an artificial plant fixedly mounted on the base; a plurality of first fiber optics embedded in the artificial plant, the first fiber optics each having a first end inserted into the base and adapted to receive light from the light source, and a second end; a plurality of first fiber optic connectors respectively mounted in the artificial plant and connected to the second end of the first fiber optics for connecting each of the first fiber optics to a respective second fiber optic; a plurality of second fiber optics respectively connected to the first fiber optic connectors and adapted for transmitting light from the first fiber optics, the second fiber optics each having a first end connected to one of the first fiber optic connectors and a second end; a plurality of third fiber optics adapted for guiding out light from the second fiber optics; and a plurality of second fiber optic connectors respectively connected between the second fiber optics and the third fiber optics, the second fiber optic connectors each having a first end connected to the second end of one of the second fiber optics, a second end connected to a number of the third fiber optics, and a convex lens disposed in between the first end and the second end and adapted to disperse light from the second fiber optics onto the third fiber optics.

DETAILED DESCRIPTION OF THE PREFERRED EMBODIMENT

Figure 1:
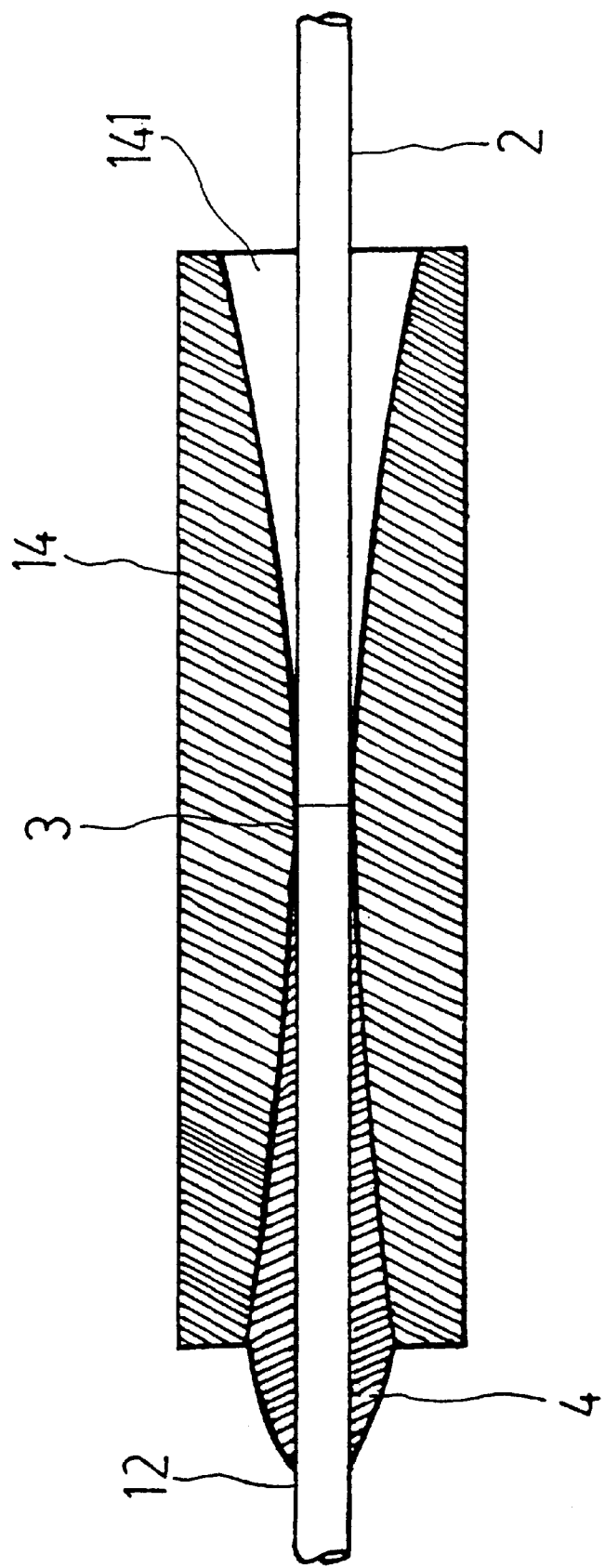
FIG. 1 is a sectional plain view showing the installation of a first fiber optic connector according to the present invention.
Figure 2:
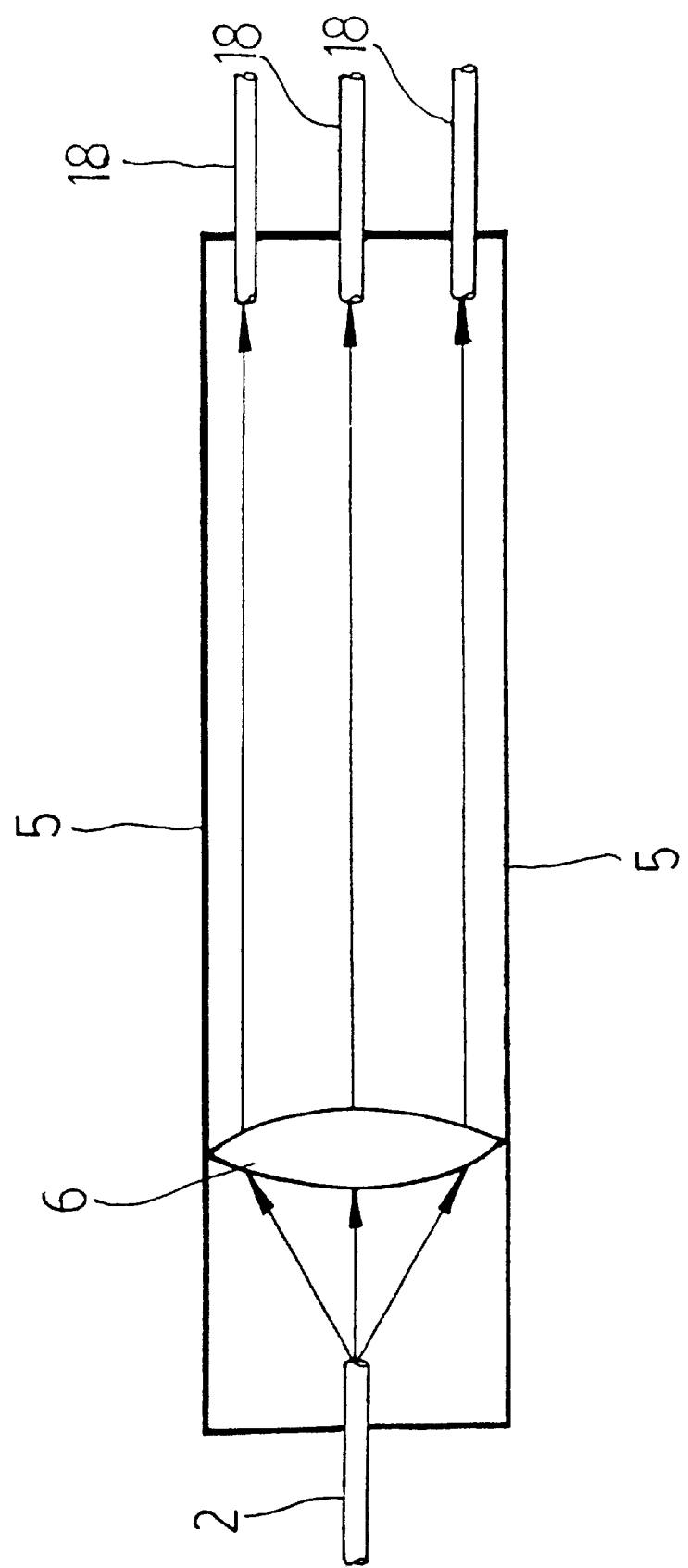
FIG. 2 is a sectional plain view showing the installation of a second fiber optic connector according to the present invention.

An ornamental display lamp assembly in accordance with the present invention comprises a plurality of first fiber optic connectors (single-in single-out fiber optic connector) 14 (see FIG. 1), and a plurality of second fiber optic connectors (single-in multi-out fiber optic connectors) 16 (see FIG. 2). A fiber optic in accordance with the present invention is comprised a plastic core of PMMA (polymethylmethacrylate), an outer shell of fluoride copolymer covered on the plastic core, and a layer of coating of polyethylene, poly vinyl chloride, or RFP (fiber reinforced plastics) covered on the outer shell. A plastic fiber optic obtained according to the present invention has mechanical properties superior than conventional quartz glass fiber optics and multi-ingredient glass fiber optics, and provides the advantages of high strength and long durability.

Referring to FIG. 1, the first fiber optic connector 14 is connected between a first fiber optic 12 and a second fiber optic 2, comprising an axial through hole extended through two distal ends thereof and formed of two conical holes 141 symmetrically disposed at the ends and a neck 3 in communication between the conical holes 141. The conical holes 141 have a diameter gradually increased toward the ends of the first fiber optic connector 14. The inner diameter of the neck 3 is approximately equal to the outer diameter of the first fiber optic 12 and the outer diameter of the second fiber optic 2. The first fiber optic 12 and the second fiber optic 2 are respectively inserted through the conical holes 141 into the neck 3, and than abutted against each other in a line in the neck 3. After installation of the fiber optics 12;2, a transparent glue 4 is filled in one conical hole 141 to fixedly secure the first fiber optic 12 to the first fiber optic connector 14. The refractive index of the glue 4 matches the cores of the fiber optics 12;2.

Referring to FIG. 2, the second fiber optic connector 16 comprises a hollow shell 5, a convex lens 6 transversely disposed in one end of the shell 5. The shell 5 has one end connected to a second fiber optic 2, and the other end connected to a plurality of third fiber optics 18. The diameter of the third fiber optics 18 is smaller than the second fiber optic 2. When light transmitted through the second fiber optic 2, the convex lens 6 dispersed incident light onto the third fiber optics 18. The shell 5 of the second fiber optic connector 16 is molded from polyethylene, polyvinyl chloride, or FRP. This second fiber optic connector 16 is practical for connecting artificial branches, leaves, flowers, fruits, etc., to an artificial plant.

Figure 3:
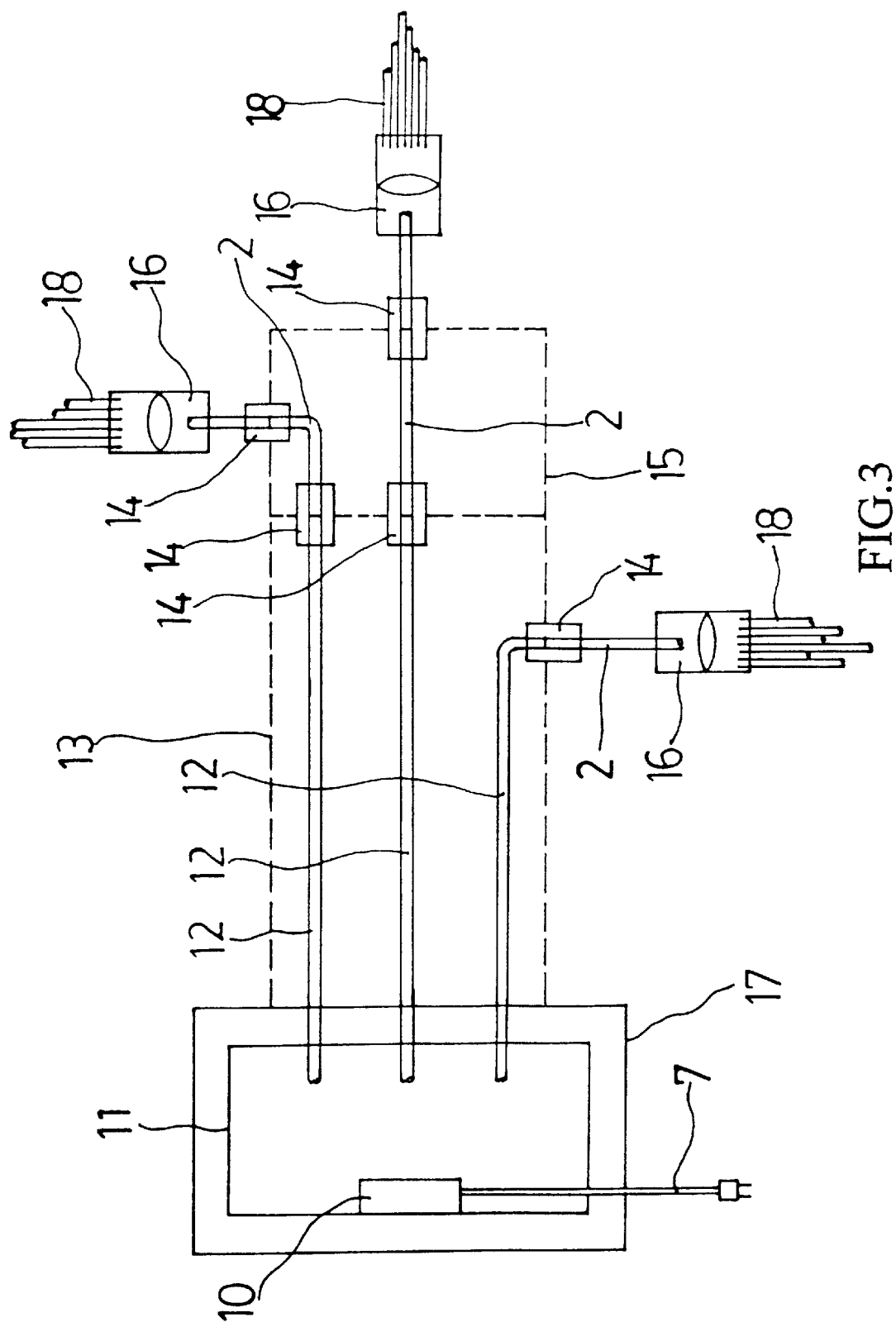
FIG. 3 is a plain view of an ornamental display lamp according to the present invention.

Referring to FIG. 3, the ornamental display lamp assembly further comprises a base 17, a light source (for example, laser generator or light emitting diode) 10 mounted on the inside 11 of the base 17, and a power cord 7 extended from the light source 10 to the outside of the base 17 for connection to power source to provide the light source 10 with the necessary working voltage.

Referring to FIG. 3 again, an artificial plastic plant trunk 13 is fixedly fastened to the base 17; a plurality of first fiber optics 12 are embedded in the artificial plastic plant trunk 13 and inserted into the inside 11 of the base 17 for guiding out light from the light source 10; a plurality of first fiber optic connectors 14 are respectively connected to the remote ends of the first fiber optics 12 and partially embedded in the artificial plastic plant trunk 13; a plurality of second fiber optics 2 are respectively connected to the first fiber optic connectors 14 outside the artificial plastic plant trunk 13; a plurality of second fiber optic connectors 16 are respectively installed to connect third fiber optics 18 to the second fiber optics 2. Further, artificial plastic branch or branches 15 may be installed in the artificial plastic trunk 13 to hold a number of the second fiber optics 2 on the inside. When assembled, the ornamental display lamp assembly shows the shape of an artificial plant. When the power cord 7 connected to power source, the light source 10 emits light, and light rays are transmitted through the first fiber optics 12 and the second fiber optics 2 to the third fiber optics 16, showing a lighting effect.

A prototype of ornamental display lamp assembly has been constructed with the features of the annexed drawings of FIGS. 1 through 3. The ornamental display lamp assembly functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. An ornamental display lamp assembly comprising:

a base;

a light source mounted inside said base;

a power cord extended from said light source to the outside of said base for connection to power source;

an artificial plant fixedly mounted on said base;

a plurality of first fiber optics embedded in said artificial plant, said first fiber optics each having a first end inserted into said base and adapted to receive light from said light source, and a second end;

a plurality of first fiber optics connectors respectively mounted in said artificial plant and connected to the second end of said first fiber optics for connecting each of said first fiber optics to a respective second fiber optics;

a plurality of second fiber optics respectively connected to said first fiber optics connectors and adapted for transmitting light from said first fiber optics, said second fiber optics each having a first end connected to one of said first fiber optics connectors and a second end;

a plurality of third fiber optics adapted for guiding out light from said second fiber optics; and a plurality of second fiber optic connectors respectively connected between said second fiber optics and said third fiber optics, said second fiber optics connectors each having a first end connected to the second end of one of said second fiber optics, a second end connected to a number of said third fiber optics, and a convex lens disposed in between the first end and the second end of the reward fiber optics connectors and adapted to disperse light from said second fiber optics onto said third fiber optics.

2. The ornamental display lamp assembly as claimed in claim 1, wherein said first fiber optics connectors each have an axial through hole extended through two distal ends thereof and formed of two conical holes symmetrically disposed at the ends and a neck in communication between said conical holes, said conical holes having a diameter gradually increased toward the ends of the respective first fiber optics connector.

3. The ornamental display lamp assembly as claimed in claim 1, wherein said light source is comprised of at least one light emitting diode.

4. The ornamental display lamp assembly as claimed in claim 1, wherein said light source is a laser generator.

* * * * *